US012462800B2

(12) United States Patent
Arangia et al.

(10) Patent No.: US 12,462,800 B2
(45) Date of Patent: Nov. 4, 2025

(54) VOICE ASSISTANCE SYSTEM

(71) Applicant: LUCYTECH S.R.L., Genoa (IT)

(72) Inventors: Alessio Arangia, Genoa (IT); Carmelo Chiarenza, Genoa (IT); Stefania Nardacchione, Genoa (IT); Corinna Mossa, Genoa (IT); Luigi Toffoletti, Genoa (IT)

(73) Assignee: LUCYTECH S.R.L., Genoa (IT)

( * ) Notice: Subject to any disclaimer, the term of this patent is extended or adjusted under 35 U.S.C. 154(b) by 362 days.

(21) Appl. No.: 17/792,884

(22) PCT Filed: Dec. 23, 2020

(86) PCT No.: PCT/IT2020/050323
§ 371 (c)(1),
(2) Date: Jul. 14, 2022

(87) PCT Pub. No.: WO2021/144819
PCT Pub. Date: Jul. 22, 2021

(65) Prior Publication Data
US 2023/0062790 A1    Mar. 2, 2023

(30) Foreign Application Priority Data

Jan. 16, 2020   (IT) .................. 102020000000742

(51) Int. Cl.
*G10L 15/22*     (2006.01)
*G06F 3/16*      (2006.01)
(Continued)

(52) U.S. Cl.
CPC .............. *G10L 15/22* (2013.01); *G06F 3/167* (2013.01); *G10L 15/063* (2013.01); *G10L 15/30* (2013.01);
(Continued)

(58) Field of Classification Search
None
See application file for complete search history.

(56) References Cited

U.S. PATENT DOCUMENTS 9,628,854 B2 * 4/2017 Gerszberg .......... H04N 21/6143
10,057,125 B1 * 8/2018 Roman ................. H04W 8/005
(Continued)

*Primary Examiner* — Pierre Louis Desir
*Assistant Examiner* — Kristen Michelle Masters
(74) *Attorney, Agent, or Firm* — Maschoff Brennan

(57) ABSTRACT

A voice assistance system is described, comprising a microphone, a processor with memory instructions configured to receive an audio input of at least one user from the microphone to identify at least one object associated with a symbol of a database, determine the preferred language associated with the symbol, transmit a wireless signal to at least one smart device, this smart device being able to interact with an object associated with a database symbol, either through a signal managed by an infrared ray activation module, and by means of a signal managed by an activation module housed in electrical derivation boxes, a power transistor providing to drive a classic relay connected to the object associated with the database symbol, such system comprising at least one further microphone, at least one further processor with memory instructions configured to receive an input put audio, and an additional loudspeaker.

17 Claims, 1 Drawing Sheet

(51) Int. Cl.
    *G10L 15/06*     (2013.01)
    *G10L 15/30*     (2013.01)
    *H04R 1/02*     (2006.01)
    *H04R 1/04*     (2006.01)
    *H04R 3/00*     (2006.01)
    *H04L 12/28*     (2006.01)

(52) U.S. Cl.
    CPC .............. *H04R 1/025* (2013.01); *H04R 1/04* (2013.01); *H04R 3/00* (2013.01); *G10L 2015/0635* (2013.01); *G10L 2015/223* (2013.01); *H04L 12/282* (2013.01); *H04R 2420/07* (2013.01)

(56) References Cited

U.S. PATENT DOCUMENTS

2016/0314782 A1     10/2016     Klimanis
2018/0165061 A1*     6/2018     Nicolich-Henkin .......................... H04L 12/282
2020/0377042 A1*     12/2020     Sorensen ................ H02J 13/00

\* cited by examiner

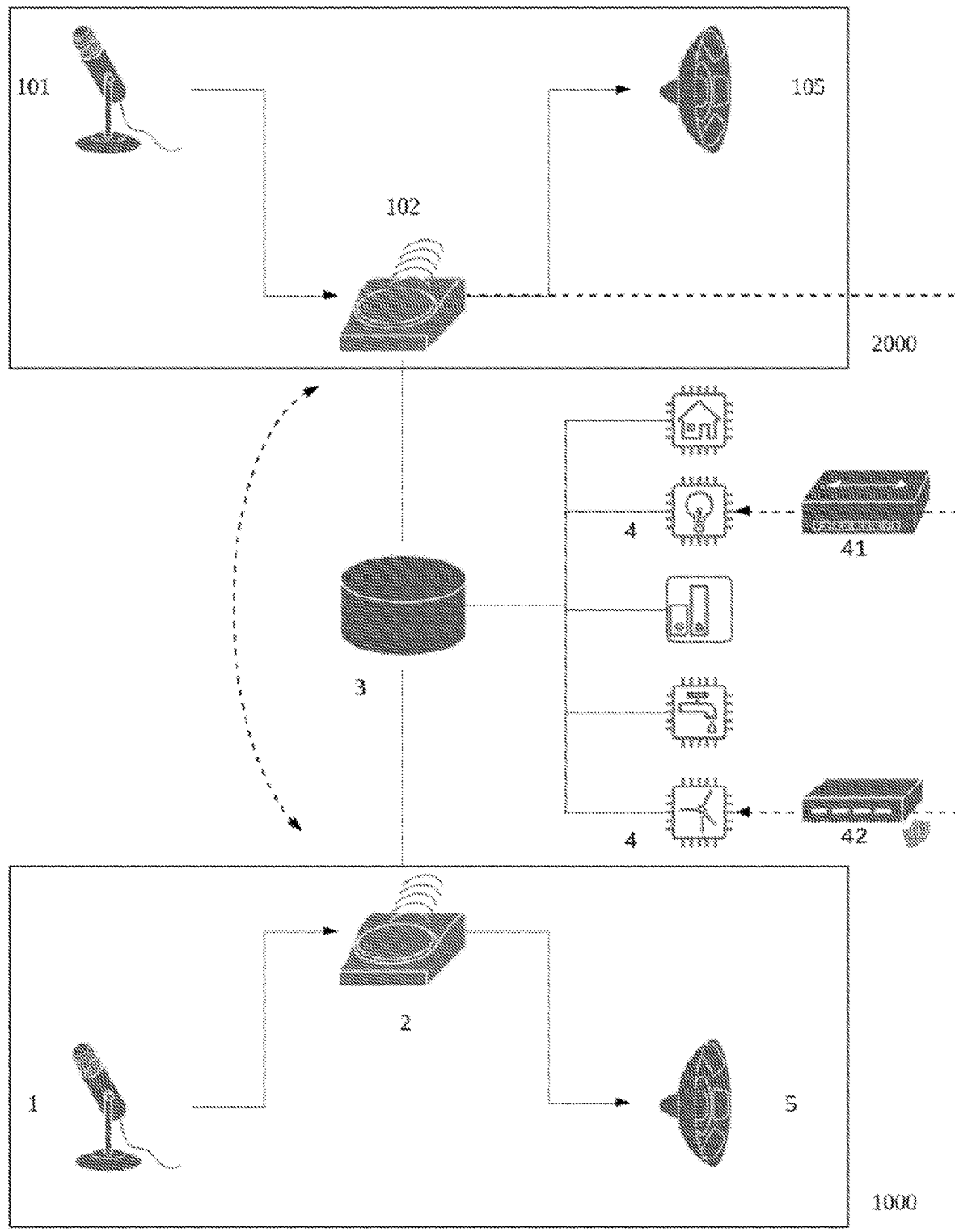

VOICE ASSISTANCE SYSTEM

The present invention relates to a voice assistance system.

In general, the present invention relates to the technical fields of speech recognition, procedures used during a speech recognition process, e.g. man-machine dialogue.

In particular, the present invention refers to the technical fields of a semiautomatic, e.g. proposed by the system, configuration or scene recognition, or recognition of an entire perception field; recognize scene-specific objects; to language recognition, exchange of configuration information about appliance services in a home automation network; to exchange of control software or macros for controlling appliance services in a home automation network, discovery of devices network, for example terminals, recognition of objects as potential candidates for recognition on the basis of visual cues, e.g. form, procedure for performing a voice command, wireless.

The state of the art is represented by US-B1-10,057,125 concerning a variety of improved methods and systems to allow users to set up and manage a variety of disparate IoT devices coupled to the framework and/or environmental operating system of an assistant device. The assistant device comprises one or more processors configured to execute instructions and to receive an input and transmit a beacon signal to one or more Internet of Things, IoT, devices in the vicinity of the assistant device, the beacon signal being a wireless signal and including a request for information about the device, receive device information from one or more IoT devices, provide audio instructions over a speaker to a user, audio instructions provided in their preferred language, based on device information, and including steps for installing one or more IoT devices, receiving an audio response via a microphone from the user in response to one or more stages of the installation, running the speech recognition algorithm on the audio response and connecting to one or more IoT devices based on the speech recognition of the audio response. The detection of the assistant device and the configuration of the IoT devices takes place by sending a beacon signal to home devices. The beacon signal can be sent using a wireless signal, which can include any wireless communication technology. In at least one embodiment, the beacon signal can be sent via LTE, LTE-Advanced, Wi-Fi, Bluetooth, ZigBee, EnOcean, personal area networks, TransferJet, ultra-broadband, WiMAX, HiperMAN, Li-Fi and/or IR. The beacon signal sent may include or indicate a request for information about the device. In at least one embodiment, one or more devices send a beacon to the assistant device.

Furthermore, the state of the art is represented by US-A1-2016/0314782 concerning a smart home device with a microphone for capturing and processing the sound recorded with a voice recognition algorithm, the microphone being supported by the existing architecture, for example, an intercom system with modules equipped with microphones already present for voice recognition. The smart home environment can also include a variety of partially communicating legacy appliances, such as IR infrared controlled wall air conditioners or other IR controlled devices, which can be controlled by IR signals provided by the smart danger detectors or switches smart wall. Technologies by which a localized thermostat service robot can identify and locate the occupant whose personal area space needs to be kept at a comfortable temperature including RFID detection (e.g. person with RFID bracelet, RFID necklace or RFID key fob), synthetic vision techniques (e.g. cameras and processors for facial recognition), audio techniques (e.g. voice, sound pattern, vibration pattern recognition), ultrasound sensing/imaging techniques, and infrared communication techniques or near field (NFC) (for example, person wearing an infrared or NFC-compatible smartphone), along with inference engines based on rules or artificial intelligence techniques that draw useful conclusions from detected information (for example, if at home there is only one occupant, that is the person whose immediate space is to be kept at a comfortable temperature and the selection of the desired temperature should match the particular stored profile of that particular occupant).

An unsolved problem of US-B1-10,057,125 is that of having to arrange Internet of Things devices in proximity to the assistant device, to ensure the transmission of a beacon signal, i.e. a wireless signal necessary to request and receive information on the assistant device.

This problem is partially solved by exploiting sensors already present in the existing domestic infrastructure, as described in US-A1-2016/0314782.

Furthermore, US-B1-10,057,125 offers the opportunity to exploit the operating versatility of the assistant device, both as a stand-alone device, or connected, for example, to other devices, as a server or as a client machine in a client-server network environment, or as a peer machine in a peer-to-peer network environment.

Object of the present invention is solving the aforementioned prior art problems by providing a voice assistance system that allows the home configuration with voice activation in which the connection of the assistant device with the plurality of Internet of Things devices is independent from the location of the plurality of Internet of Things devices.

A further object is providing a voice assistance system that allows home configuration with voice activation that does not aesthetically alter the existing architecture.

A further object is providing a voice assistance system which allows home configuration with voice activation which is easy to configure.

The above and other objects and advantages of the invention, as will emerge from the following description, are achieved with a voice assistance system, such as that described in claim 1. Preferred embodiments and non-trivial variants of the present invention form the subject matter of the dependent claims.

It is understood that all enclosed claims form an integral part of the present description.

It will be immediately obvious that innumerable variations and modifications (for example relating to shape, dimensions, arrangements and parts with equivalent functionality) can be made to what has been described without departing from the scope of the invention as appears from the attached claims.

The present invention will be better described by some preferred embodiments, provided by way of non-limiting example, with reference to the attached drawings, in which the only FIG. 1 shows a functional diagram of an embodiment of the voice assistance system according to the present invention.

Referring to FIG. 1, it is possible to note that a voice assistance system according to the present invention comprises a microphone 1, a processor with memory instructions configured to receive an audio input 2 of at least one user from the microphone 1 to identify at least one object associated with a symbol of a database 3, determine the preferred language associated with the symbol, transmit a wireless signal to at least one smart device 4, the wireless signal including a request for information about the smart device 4, receive the information required to provide audio instructions via a speaker 5, the audio instructions provided in your preferred language including steps to install the smart device 4, receive an audio response via microphone 1 from the user in response to one or more installation steps, run the speech recognition algorithm on the audio response, and connect to the smart device 4 according to the recognition vocal test of the audio response.

Advantageously, the system according to the present invention also comprises at least one further microphone 101, at least one further processor with memory instructions configured to receive an audio input 102 of at least one user from the further microphone 101, transmit a wireless signal to the intelligent device 4 via the further memory instruction processor configured to receive an audio input 102, the wireless signal including a request for information about the smart device 4, receive the requested information via the further memory instruction processor configured to receive an audio input 102 for providing audio instructions via an additional speaker 105, receiving an audio response via the additional memory instruction processor configured to receive audio input 102 via the additional microphone 101 from the user in response to one or more installation steps, run the recognition algorithm voice test on the audio response, and connect to the smart device 4 based on the voice recognition of the audio response, via the additional processor with memory instructions configured to receive an audio input 102.

The intelligent device 4 is designed to be able to interact with an object associated with a database symbol 3 through a signal managed by an infrared activation module 41.

Furthermore, the intelligent device 4 is designed to be able to interact with an object associated with a symbol of the database 3 by means of a signal managed by an activation module housed in electrical junction boxes 42, a power transistor providing to drive a classic relay connected to the object associated with a database symbol 3.

The wireless signal to at least one smart device 4 is that of a Bluetooth transceiver.

Each symbol of database 3 can be updated, and new symbols can be added to database 3, such as commands, response phrases, temporary users.

Through a home Wi-Fi network it is possible to make different users communicate, control the flow of users entering and leaving the system, manage security, send a notification to users who own the system according to the present invention, manage a clipboard console, deadlines, agenda, etc.

The system according to the present invention is based on an independent architecture, not including any type of internet connection.

The system according to the present invention consists of a central housing 1000 provided to house the microphone 1, the processor with memory instructions configured to receive an audio input 2, the loudspeaker 5, and of at least one satellite housing 2000 provided to house a further microphone 101, a further processor with memory instructions configured to receive an audio input 102, a further loudspeaker 105.

Both the central housing 1000 and the satellite housing 2000 are designed to be powered by an external electrical network or by a battery.

The voice assistance system object of the present invention is developed into a furnishing object with all the electronics for operation inside it. The modules in the electrical junction drawers interact with the existing electrical system to control lights, sockets, motion of the shutters, etc. All voice commands are received and sent via the modules interface with the original lights and sockets of the existing system, without external devices such as sockets and smart lamps. The configuration of the devices via smartphone allows personalized programming by activating, under certain conditions, several users at the same time, for example, motion of the shutters simultaneously with the lighting in the kitchen.

CONFIGURATION EXAMPLE

Night scenery. Action: at my voice command I want the shutters to close, all the lights to be turned off and the bedside lamps to be turned on.

Unlike the already existing commercial devices, the voice assistance system according to the present invention has satellite modules in each room, repeaters to allow the user to give voice commands and listen to the answer wherever he is. The satellite modules are powered by the mains or by an internal battery connected to the central controller.

The satellite modules are equipped with a Bluetooth transceiver, a microphone, a loudspeaker and a software that receives the given voice command and transmits it via radio to the mainboard to process and operate the outputs programmed by the user, also transmitting the command voice response transmitted to the satellite modules. By placing the mainboard in the centre of the house and a satellite module for each room, the commands are given to be able to hear the answers in each room. Another function of the satellite modules concerns the acquisition and transmission of infrared signals from external sources such as remote controllers, remote controls and others, since it is possible to make the system interact with all devices normally controlled by infrared remote controls, TVs, air conditioners, radios, etc.

All data management, including voice processing deriving from satellite modules, is the responsibility of a central module located in a strategic point of the house, with a non-invasive or unsightly design such as a modem or similar devices.

Inside the central module, the mainboard houses a single board PC, with a high computing capacity, able to simultaneously manage all requests coming from the outside, such as voice commands, Wi-FI information from the smartphone or other associated devices, in addition to the output processing of all the modules placed in the junction boxes of the electrical network.

Among the advantages, customization allows other existing devices to respond not in a single way by lowering the quality of all installations, but to learn new response phrases and new commands. Through a learning software, it is possible at any time to add new commands, new response phrases and involve figures from outside the living area, such as friends.

The learning procedure carried out through the software makes use of a database with default signals such as basic voice commands. Speech recognition takes place through a speech engine called speech engine, which converts audio into text in the following way, by way of example. For the command: switching on the hall lights, the mainframe translates the voice signal into text by searching each sentence for the words present in the database. In fact, in the database there are two words: switch on, room, contained in the sound signal, designed to allow you to activate the associated command, sending a Wi-Fi signal exclusively to the module in the derivation drawer of the room light bulb. The user can formulate the sentence in any way as many words associated with the command are contained, reducing the risk, in the event of background noises, of misunderstanding. For example:

USER "add voice command"
System "Say voice command"
USER "turn on air conditioner"
System "Do you confirm to turn on the air conditioner?"
USER "No"
USER "Yes"
System "Speak reply phrase"
USER "ok Marco, air conditioner on"
System "do you confirm ok Marco air conditioner on?"
USER "No"
USER "Yes"
System "indicate the module to be activated"
USER "module 3"
System "do you confirm module 3?"
USER "No"
USER "Yes"
System "New command acquired"

The assignment of the numbers relating to the modules takes place upon the first start of the system through a procedure for acquiring modules and satellite modules. Furthermore, with this procedure it is also possible to store new dialogues not necessarily connected to an action on the modules.

People recognition. The object of the present invention uses the home Wi-Fi network to be able to communicate with the components by controlling entrance and exit and discriminating the notification of each smartphone in the area of interest. The recognition of the accesses allows sending a notification to the associated mobile phones, possibly through a mini-camera, in order to receive a photo of the change just notified. The object of the present invention incorporates the mobile phone outside the home in the system to allow the notification of system changes to the distant user. In addition, an agenda is incorporated to manage commitments, shopping lists, personalized appointments for the user who is at home. The management of security passwords is also provided.

Activation forms. The activation modules are small Wi-Fi objects that are housed in the electrical derivation drawers of the central module, in order to receive commands from the mainframe and activate the associated output, such as lamps, appliances, etc. In particular, the W-Fi ESP8826 module with the help of a power transistor drives a classic relay to which the device to be activated is connected. In some electrical systems, there are step-by-step relays connected by a button instead of a switch. To make the system compatible also on these systems, the module is equipped with a configuration switch, deep-switch, in order to make the output impulsive or not. Through a feedback input, the ESP8826 Wi-Fi module is able to determine that the device, lamp, has been switched on and to understand if the light is already on or not as the system with the original switches is not altered, so it is can be turned on both manually and vocally.

The invention claimed is:

1. A voice assistance system, comprising:
a microphone,
a processor with memory instructions configured to:
receive an audio input of at least one user from the microphone to identify at least one object associated with a symbol of a database,
determine the preferred language associated with the symbol,
transmit a wireless signal to at least one smart device, the wireless signal including a request for information about said at least one smart device,
receive the information required to provide audio instructions via a speaker, the audio instructions being provided in a preferred language for the user, including steps for installing said at least one smart device,
receive an audio response via the microphone from the user in response to one or more stages of the installation,
run the voice recognition algorithm on the audio response, and
connect to said at least one smart device depending on voice recognition of the audio response,
at least one further microphone, and
at least one further processor with memory instructions configured to:
receive an audio input of at least one user from said at least one further microphone,
transmit a wireless signal to said at least one smart device via said at least one further processor with memory instructions configured to receive an audio input, the wireless signal including a request for information about the smart device,
receive the information requested via said further processor with memory instructions configured to receive an audio input to provide audio instructions via a further speaker,
receive an audio response via said at least one further processor with memory instructions configured to receive an audio input through said at least one further microphone from the user in response to one or more stages of the installation,
run the voice recognition algorithm on the audio response, and
connect to said at least one smart device based on the voice recognition of the audio response, via said at least one additional processor with memory instructions configured to receive the audio input,
wherein:
said at least one intelligent device is provided to be able to interact with an object associated with a symbol of said database using a signal managed by an activation module housed in electrical derivation drawers, and
a power transistor is configured to drive a relay connected to the object associated with a symbol of said database.

2. The system according to claim 1, wherein said at least one intelligent device is provided to be able to interact with an object associated with a symbol of said database through a signal managed by a ray activation module in the infrared.

3. The system according to claim 1, wherein the wireless signal to at least one intelligent device is that of a wireless transceiver.

4. The system according to claim 1, wherein:
each symbol of said database is updated, and
new symbols are added to said database, including commands, response phrases, and temporary users.

5. The system according to claim 1, wherein, through a home Wi-Fi network different users communicate, control the flow of users entering and leaving the system, managing security, send a notification to the user's system owners, and manage a console of notes, deadlines, and agenda.

6. The system according to claim 1, wherein the system is based on an independent architecture, not including any type of internet connection.

7. The system according to claim 1, further comprising:
a central housing designed to house said microphone, said processor with memory instructions being configured to receive an audio input,
said speaker, and
at least one satellite housing provided to house said at least one further microphone, said at least one further processor with memory instructions being configured to receive an audio input, said further speaker, both said central housing and said at least one satellite housing being designed to be powered by an external electrical network or by a battery.

8. The system according to claim 2, wherein the wireless signal to at least one intelligent device is that of a wireless transceiver.

9. The system according to claim 8, wherein:
each symbol of said database is updated, and
new symbols are added to said database, including commands, response phrases, and temporary users.

10. The system according to claim 9, wherein, through a home Wi-Fi network different users communicate, control the flow of users entering and leaving the system, managing security, send a notification to the user's system owners, and manage a console of notes, deadlines, and agenda.

11. The system according to claim 10, wherein the system is based on an independent architecture, not including any type of internet connection.

12. The system according to claim 2, wherein:
each symbol of said database is updated, and
new symbols are added to said database, including commands, response phrases, and temporary users.

13. The system according to claim 3, wherein:
each symbol of said database is updated, and
new symbols are added to said database, including commands, response phrases, and temporary users.

14. The system according to claim 2, wherein, through a home Wi-Fi network different users communicate, control the flow of users entering and leaving the system, managing security, send a notification to the user's system owners, and manage a console of notes, deadlines, and agenda.

15. The system according to claim 3, wherein, through a home Wi-Fi network different users communicate, control the flow of users entering and leaving the system, managing security, send a notification to the user's system owners, and manage a console of notes, deadlines, and agenda.

16. The system according to claim 2, wherein the system is based on an independent architecture, not including any type of internet connection.

17. The system according to claim 3, wherein the system is based on an independent architecture, not including any type of internet connection.

* * * * *